(12) United States Patent  
Hammerschmidt et al.

(10) Patent No.: US 9,489,607 B2  
(45) Date of Patent: Nov. 8, 2016

(54) SEMICONDUCTOR DEVICE AND AN IDENTIFICATION TAG

(71) Applicant: Infineon Technologies AG, Neubiberg (DE)

(72) Inventors: Dirk Hammerschmidt, Villach (AT); Bernhard Goller, Villach (AT); Gerald Holweg, Graz (AT); Thomas Herndl, Biedermannsdorf (AT)

(73) Assignee: Infineon Technologies AG, Neubiberg (DE)

( * ) Notice: Subject to any disclaimer, the term of this patent is extended or adjusted under 35 U.S.C. 154(b) by 58 days.

(21) Appl. No.: 13/896,676

(22) Filed: May 17, 2013

(65) Prior Publication Data

US 2014/0339313 A1  Nov. 20, 2014

(51) Int. Cl.
*G06K 19/06* (2006.01)
*G06K 19/07* (2006.01)
*G06K 19/073* (2006.01)

(52) U.S. Cl.
CPC ......... *G06K 19/0723* (2013.01); *G06K 19/073* (2013.01); *G06K 19/0704* (2013.01); *G06K 19/0705* (2013.01); *G06K 19/0717* (2013.01)

(58) Field of Classification Search
CPC ........ G06F 1/3212; G06F 1/26; G06F 19/00; G06F 19/3456; G06F 1/163; G06K 19/0702; G06K 19/0717; G06K 19/073; G06K 19/077; G06K 19/07724; G06K 19/07749; G06K 19/0704; G06K 19/0723; H02J 7/00; H01M 10/00; H01M 2/08; H01M 6/00; H01M 6/04; H01M 6/10; H01M 6/12
USPC ...... 320/128; 340/870.16; 343/853; 438/455
See application file for complete search history.

(56) References Cited

U.S. PATENT DOCUMENTS

| | | | |
|---|---|---|---|
| 2002/0186145 A1* | 12/2002 | Chainer et al. | 340/870.16 |
| 2003/0152815 A1* | 8/2003 | LaFollette | H01M 2/0202 429/7 |
| 2003/0226951 A1* | 12/2003 | Ye et al. | 250/208.1 |
| 2007/0254455 A1* | 11/2007 | Yamaguchi et al. | 438/455 |
| 2008/0079396 A1* | 4/2008 | Yamazaki et al. | 320/128 |
| 2012/0061569 A1* | 3/2012 | Noguchi | 250/338.3 |
| 2012/0223400 A1* | 9/2012 | Jackson et al. | 257/415 |
| 2013/0050047 A1* | 2/2013 | Carr | 343/853 |
| 2014/0176041 A1* | 6/2014 | Sun | 320/101 |

FOREIGN PATENT DOCUMENTS

CN  1695161 A  11/2005

* cited by examiner

*Primary Examiner* — Thien T Mai  
(74) *Attorney, Agent, or Firm* — Murphy, Bilak & Homiller, PLLC

(57) ABSTRACT

A semiconductor device includes a semiconductor substrate, a battery attached to the semiconductor substrate, and a sensor attached to the semiconductor substrate. The battery is electrically connected to the sensor and configured to supply the sensor with electrical power.

7 Claims, 3 Drawing Sheets

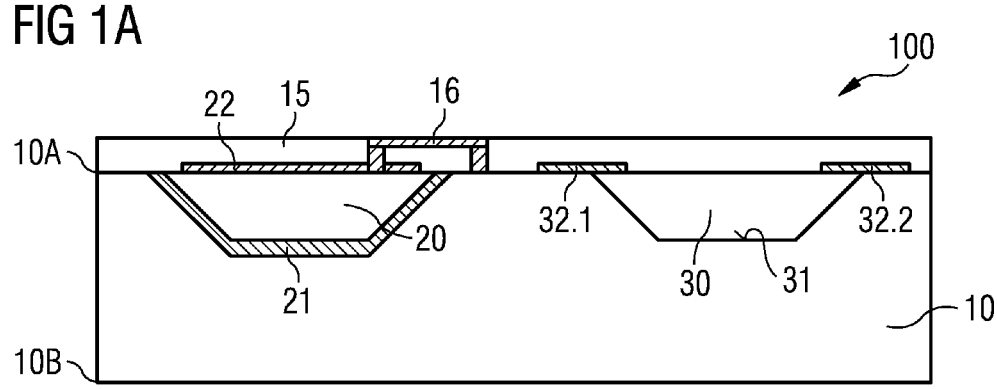
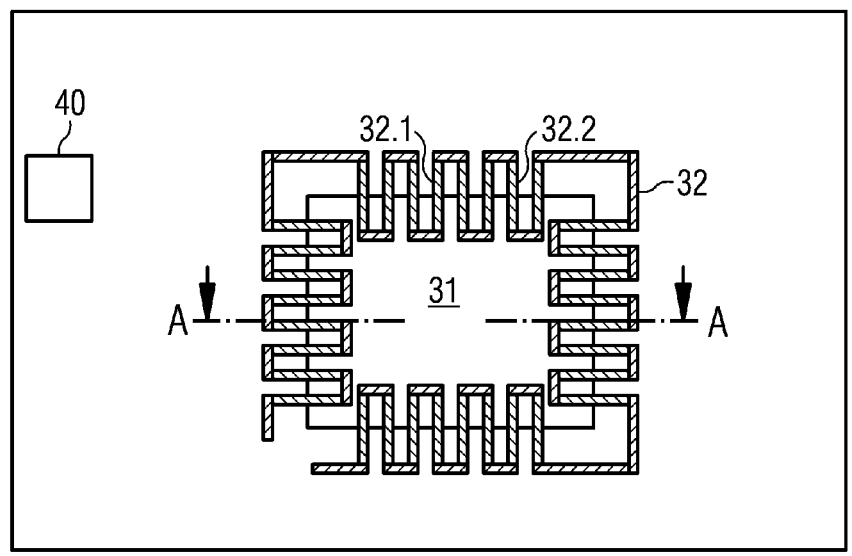

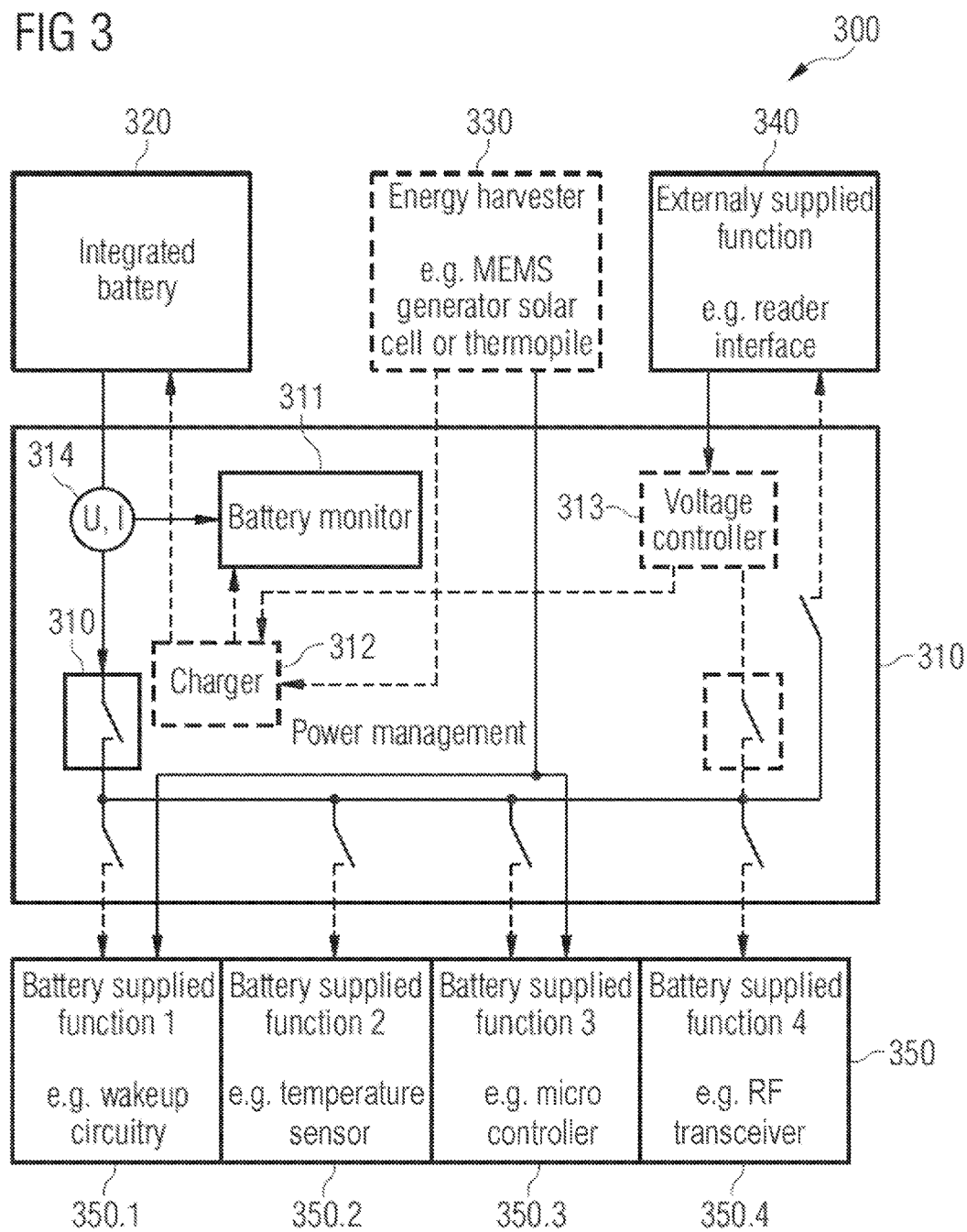

SEMICONDUCTOR DEVICE AND AN IDENTIFICATION TAG

TECHNICAL FIELD

Embodiments described herein relate to semiconductor devices, and more specifically to semiconductor devices that include identification tags.

BACKGROUND

There is a continuing need to determine the identity and the location of objects associated with, for example, inventory, product manufacturing, merchandizing, and related operations. Such operations create challenges for accurately monitoring the location and flow of the object. A tag device suitably configured to be associated with any of a variety of objects such as, goods, items, persons, or animals, or any other kind of moving object, that facilitates location and data tracking can be used to monitor the movements of the object. One such tag tracking system is an electronic identification system, such as RFID. RFID tags are attached, connected, or in some way associated with an object for the purpose of tracking the object, and storing and retrieving information about the object.

Any data or information related to the object to which an RFID tag is attached can be written to and stored in a memory in the RFID tag. The RFID tag will be detected by a special reader in a suitable electromagnetic field, and the information stored in the tag can be read and changed, if desired. Typically, RFID tag devices are entirely passive, meaning that they do not include an on-board power supply. This results in a small and portable package. However, passive tags are only capable of operation over a relatively short range and limited by the extension of the field used to supply power and to communicate with the tags.

An active RFID tag includes a power supply connected to the tag to increase the detectable range. However, with the addition of a battery the RFID tag becomes physically larger and more expensive. Large and rigid tags reduce the usefulness of the tags by restricting applications.

SUMMARY

According to an embodiment, a semiconductor device includes a semiconductor substrate, a battery attached to the semiconductor substrate, and a sensor attached to the semiconductor substrate. The battery is electrically connected to the sensor and configured to supply the sensor with electrical power.

According to another embodiment, an identification tag includes a semiconductor substrate, a battery integrated in the semiconductor substrate, and a sensor integrated in the semiconductor substrate.

According to another embodiment, an identification tag includes a memory configured to store identification information, a battery, and a sensor. The battery is electrically connected to the sensor and configured to supply the sensor with electrical power.

Those skilled in the art will recognize additional features and advantages upon reading the following detailed description, and upon viewing the accompanying drawings.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

FIG. 1 shows a schematic cross-sectional side view of a semiconductor device (A) comprising a battery and a temperature sensor according to an embodiment and a top view of the sensor area (B).

FIG. 3 shows a schematic block of a radio frequency identification (RFID) tag according to an embodiment.

DETAILED DESCRIPTION

Figure 2A:
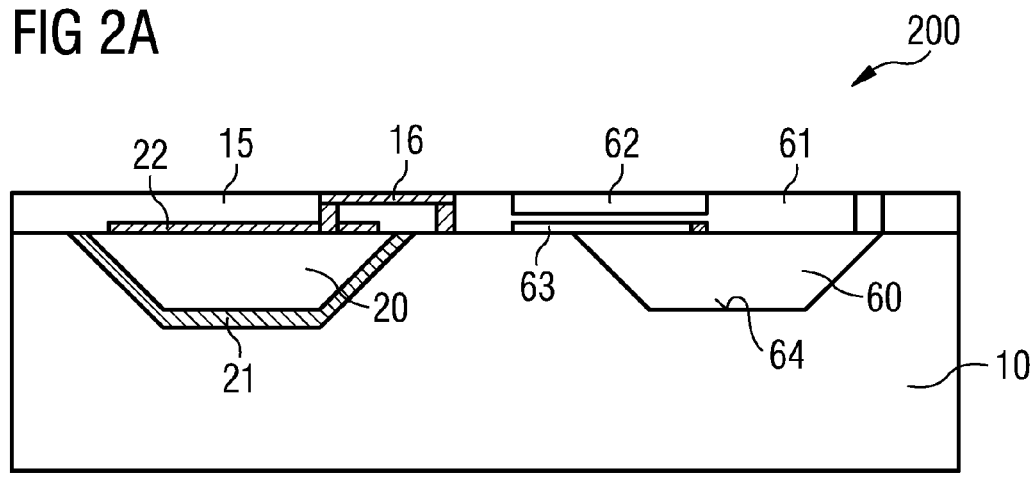
FIG. 2 shows a schematic cross-sectional side view of a semiconductor device (A) comprising a battery and a shock sensor and a top view of the sensor area (B).

The aspects and embodiments are now described with reference to the drawings, wherein like reference numerals are generally utilized to refer to like elements throughout. In the following description, for purposes of explanation, numerous specific details are set forth to provide a thorough understanding of one or more aspects of the embodiments. It may be evident, however, to one skilled in the art that one or more aspects of the embodiments may be practiced with a lesser degree of the specific details. In other instances, known structures and elements are shown in schematic form to facilitate describing one or more aspects of the embodiments. It is to be understood that other embodiments may be utilized and structural or logical changes may be made without departing from the scope of the present invention. It should be noted further that the drawings are not to scale or not necessarily to scale.

In addition, while a particular feature or aspect of an embodiment may be disclosed with respect to only one of several implementations, such feature or aspect may be combined with one or more other features or aspects of the other implementations as may be desired and advantageous for any given or particular application. Furthermore, to the extent that the terms "include", "have", "with" or other variants thereof are used in either the detailed description or the claims, such terms are intended to be inclusive in a manner similar to the term "comprise". The terms "coupled" and "connected", along with derivatives may be used. It should be understood that these terms may be used to indicate that two elements co-operate or interact with each other regardless whether they are in direct physical or electrical contact, or they are not in direct contact with each other. Also, the term "exemplary" is merely meant as an example, rather than the best or optimal. The following detailed description, therefore, is not to be taken in a limiting sense, and the scope of the present invention is defined by the appended claims.

In particular embodiments, layers or layer stacks may be applied to one another or materials may be applied or deposited onto layers. Any terms such as "applied" or "deposited" are meant to cover any known techniques of applying layers onto each other. In particular, the terms "applied" or "deposited" are meant to cover techniques in which layers are applied at once as a whole like, for example, laminating techniques as well as techniques in which layers are deposited in a sequential manner like, for example, sputtering, plating, molding, CVD, etc.

The semiconductor devices may comprise contact elements or contact pads on one or more of their outer surfaces wherein the contact elements serve for electrically contacting the semiconductor devices. The contact elements may have any desired form or shape. They can, for example, have the form of lands, i.e. flat contact layers on an outer surface of the semiconductor package. The contact elements or contact pads may be made from any electrically conducting material, e.g. from a metal as aluminum, gold, or copper, for example, or a metal alloy, or an electrically conducting organic material, or an electrically conducting semiconductor material.

The terms "connected" and "coupled" include a direct connection between the elements that are connected, or an indirect connection through one or more either passive or active elements, intermediary devices or components.

The meaning of "a", "an", and "the" include plural references. The meaning of "in" includes "in" and "on". Additionally, a reference to the singular includes a reference to the plural unless otherwise stated or is inconsistent with the disclosure herein.

FIG. 1A shows a schematic cross-sectional side view representation of a semiconductor device according to an embodiment. FIG. 1B shows a top view representation of the sensor area of the semiconductor device.

The semiconductor device 100 of FIG. 1A includes a semiconductor substrate 10, a battery 20 attached to the semiconductor substrate 10, and a sensor 30 attached to the semiconductor substrate 10. The battery 20 is electrically connected to the sensor 30 and supplies the sensor 30 with electrical power.

In the embodiment shown in FIGS. 1A-1B, the sensor 30 includes a temperature sensor. In general, however, the sensor 30 may be any kind or type of sensor, for example, a shock sensor, an acceleration sensor, a radiation sensor, and electric or magnetic field sensor. The sensor 30 may be configured in the form of a micro-electromechanical sensor (MEMS). The sensor 30 may also be configured such that it performs the function of an energy harvester. In such a case, the energy harvester may be configured, for example, to recharge the battery.

According to an embodiment of the semiconductor device, the sensor is a temperature sensor including at least one of: a thermocouple or a thermopile.

According to an embodiment of the semiconductor device, the sensor includes one or more of: a shock sensor and an acceleration sensor, wherein the shock sensor or the acceleration sensor includes a movable element and a piezoelectric element connected to the movable element.

According to an embodiment of the semiconductor device, the sensor includes a radiation sensor, wherein the radiation sensor includes one or more of a PN-junction and a photodiode.

According to an embodiment of the semiconductor device, the sensor includes an electric or magnetic field sensor, wherein the electric or magnetic field sensor includes a field sensing element such as, a Hall sensor, an anisotropic magnetoresistive sensor, a tunnel magnetoresistive sensor or a giant magnetoresistive (GMR) sensor.

According to an embodiment of the semiconductor device, the sensor is configured to sense a predetermined value, e.g. temperature, acceleration, radiation, etc., and either the sensor itself or a circuitry connected with the sensor is configured to detect when the predetermined value exceeds or falls below a predetermined threshold value. The circuitry may further be configured to record when the predetermined value exceeds or falls below the predetermined threshold value. Such an event may be recorded in a memory that may be attached to or integrated in the semiconductor substrate of the semiconductor device.

According to an embodiment, the semiconductor device is configured as an identification tag and further includes a memory to store identification information therein. The identification information is intended to uniquely identify an object to which the identification tag is attached. The memory may then also be used to record events as described before. In a reading operation, a reader is brought to a spatial distance and position relative to the tag so that the memory of the tag can be read out. The identification tag may be further configured as a radio frequency identification (RFID) tag in which case it further includes a radio frequency transceiver.

According to an embodiment, the sensor is fabricated using processing steps of the fabrication process of the battery, e.g. the micromachined cavity or the layer of the membrane that is used to close the battery cell and carry the second electrode.

The semiconductor device 100 as shown in FIG. 1 A includes a semiconductor substrate 10, e.g., a silicon substrate. The semiconductor substrate 10 includes a first upper main face 10A and a second lower main face 10B. The battery 20 is mainly arranged within a first recess area formed in the first main face 10A. The battery 20 includes a first battery electrode 21 disposed on the entire bottom surface of the first recess area. The first recess area is completely filled by a battery body of the battery 20. An upper surface of the battery body, which is coplanar with an upper surface of the semiconductor substrate 10, is covered by a second battery electrode 22. An encapsulation or sealing layer 15 is applied onto the semiconductor substrate 10 and the first and second recess areas so that it covers also the second battery electrode 22. Within the encapsulation layer 15, a routing or wiring layer 16 may be disposed that is connected with the second battery electrode 22 and may have an upper surface coplanar with the upper surface of the encapsulation layer 15 and may serve to connect the battery 20 with external devices or elements. The routing layer 16 may also be used to connect the battery 20 with the temperature sensor 30.

The temperature sensor 30 may include an empty recess area 31 and a thermopile 32. The thermopile 32 may be configured in the form of a meander with alternating sections of p-doped silicon 32.1 and n-doped silicon 32.2. The thermopile 32 can be applied onto a thin membrane or diaphragm that covers the second recess area and is substantially coplanar with the first main face 10A of the silicon substrate 10. The thermopile 32 is also covered by the encapsulation layer 15. The empty space 31 may be connected to the outside so that the temperature within the empty space 31 corresponds to the ambient temperature of the semiconductor device 100. The semiconductor device 100 may be attached to a surface of an object for monitoring a temperature difference between the object and the ambient temperature. If the semiconductor device 100 is attached to a surface of the object that has a temperature that differs significantly from the ambient temperature on the other side of the semiconductor device 100, the thermopile 32, which operates on the basis of the Seebeck effect, can be used to create a current from the hot to the cold side. In cases with large temperature gradients, this current might be useful for charging the battery 20, but in many cases the thermopile 32 is solely used to detect a temperature difference. In the case of, for example, cooled or frozen goods, the tag may be attached on the surface of the monitored object. For the critical case that the cooling chain is interrupted, the temperature between the surface of the cooled good has a significantly lower temperature than the ambient temperature. In this case, the silicon substrate 10 may be used to conduct one side of the thermopile 32 to the cold object while the other side of the thermopile 32 is thermally coupled to a region of the chip surface that is warmed up by the ambient temperature. The thermopile 32 will deliver a detectable voltage that can be observed with an ultra low power threshold detection circuit. An absolute temperature sensor that consumes much more energy can be activated if the threshold for the temperature difference is exceeded, even if this event appears during a period where no temperature measurement is not scheduled. Thus, the temperature measurement period may be increased significantly, e.g., 30 min between two measurements instead of a view seconds, without taking a risk to miss relevant temperature changes in-between. The tolerable distance between two wake-ups of the absolute temperature sensor is reciprocal to the sensitivity of the thermopile 32.

FIG. 1B shows a top view representation of a temperature sensor comprising the empty space 31 and the thermopile 32. The cross-sectional view of FIG. 1A is taken along a plane A-A shown in FIG. 1B. If the ambient temperature differs from the temperature of the silicon substrate 10, the diaphragm can adapt to the ambient temperature due to the low thermal mass and high thermal resistance. The p and n doped conductors of the thermopile 32 cross the border between the two different temperature regions and the Seebeck effect will cause a movement of free charge carriers from the warm to the cold side. This flow of charge carriers builds up a voltage along the conductor proportional to the temperature gradient. Since all conductors are connected in series and the p and n doped regions have charge carriers of different polarity, all voltage drops sum up to a relatively high output voltage that is proportional to the temperature difference.

Also shown in FIG. 1B is a battery temperature sensor 40 (not shown in FIG. 1A) that may be integrated in the silicon substrate 10 and may be disposed in a relative vicinity to the battery 20 to monitor the temperature of the battery 20. Further shown in FIG. 1B is a power management unit 50 that may include an integrated circuit chip and may be integrated in the silicon substrate 10, the function of which will be explained herein.

The semiconductor device 100 of FIGS. 1A-1B can be configured as an identification tag, in particular a radio frequency identification tag (RFID) wherein a radio frequency transceiver chip is integrated in the silicon substrate 10 and an antenna is connected with the radio transceiver chip.

Figure 2B:
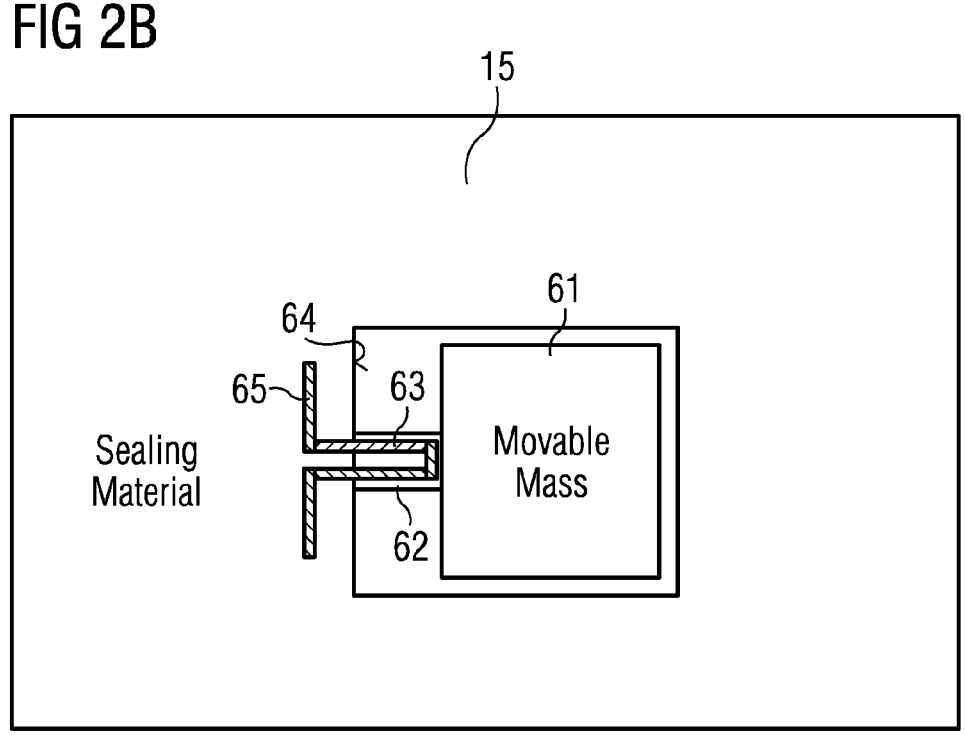

FIG. 2A shows a cross-sectional side view representation of a semiconductor device 200 according to an embodiment. The semiconductor device 200 also includes a battery 20 that may be configured in the same way as the battery 20 of FIG. 1A. The semiconductor device 200 further includes a shock sensor 60 which is shown in further detail in the top view representation of FIG. 2B. The shock sensor 60 includes a movable mass 61, a cantilever 62 connected to the movable mass 61 and a piezoelectric layer 63 applied to the cantilever 62. The movable mass 61 and the cantilever 62 can be formed contiguous with the sealing or encapsulation layer 15 by performing an additional structuring of the encapsulation layer 15. The encapsulation layer 15 may be made of silicon, glass or any kind of synthetic material. The shock detector 60 further includes an empty space 64 formed in the first main face 10A of the silicon substrate 10. The material of the piezoelectric layer 63 can be sputtered on the cantilever 62 so that it needs not to be integrated into the fabrication process of the silicon wafer that carries the electronic components. The piezoelectric layer 63 is connected with a wiring layer 65.

The semiconductor device 200 can be used as an identification tag for monitoring of goods that are in motion due to transports. The semiconductor device 200 may also be used to harvest energy from the kinetic energy of the motion. Of course, the available energy is depends on factors such as, the strength of the acceleration, the occurrence probability of acceleration periods and on the size of the movable mass that is used in the harvester. The semiconductor device 200 can be configured in such a way that the shock sensor 60 in its function as an energy harvester only delivers energy in case of acceleration so that it can be used as an event detection sensor, which recognizes shocks that exceed a particular threshold energy. This consumes energy to wake up the acceleration measurement block and consume energy from the battery than conventional acceleration sensors. This must happen quite often in order to avoid missing short shocks. This is completely unnecessary with a harvester that will deliver energy proportionally to the acceleration in case of an event. In this case, further acceleration measurement electronic to process the acceleration signal that comes from the harvester must not be waked-up if the harvested signal energy stays below a threshold.

Another possible application example of a semiconductor device is the monitoring of products that should not be exposed to light or infrared radiation. The radiation sensor in this case could be a simple PN junction that delivers a photo-current. The operation is very similar to the one described for the temperature monitoring tag in FIG. 1A,B. The dark current of this photodiode could be monitored by a threshold detector, with a minimum of battery current consumption. If the threshold is exceeded, the event can be logged and, if necessary, a more precise measurement can be initiated. Possible applications of such light monitoring tags might be film materials or light sensitive pharmaceutical products. Light sensitive tags may also be used in alarm systems to monitor if doors or windows are opened.

FIG. 3 shows a schematic block diagram of a radio frequency identification (RFID) tag according to an embodiment. The RFID tag 300 of FIG. 3 includes a power management unit 310, an integrated battery 320, and an energy harvester 330 that may also be usable as a sensor, e.g., a thermopile, wherein the configuration can also be vice verso in that reference sign 330 denotes a sensor which can also be usable as an energy harvester. The RFID tag 300 further includes a reader interface 340 and at least one battery supply block 350. Furthermore, there may be additional battery supplied blocks that may be controlled separately by the power management unit 310 and blocks that receive external energy if the tag is in contact to a reader station. If the function of an externally supplied function is partially or completely required outside the reader, the blocks may be supplied by the battery 320 as well.

The battery supplied block 350 includes a plurality of sections corresponding to different battery supplied functions. A first section 350.1 may include a function of supplying energy to a wake-up security. A second section 350.2 may include a function of supplying energy to the sensor or energy harvester 330. A third section 350.3 may include a function of supplying energy to a micro-controller. A fourth section 350.4 may include a function of supplying energy to a radio frequency transceiver. Of course, there may be further sections corresponding to further battery supplied functions.

The power management unit 310 includes a battery monitor 311 that may correspond to the battery temperature sensor 40, as shown in FIG. 1B, a charger 312, a voltage controller 313, and a plurality of electrical switches. In operation, the tag 300 may run through a sequence of operations that may be scheduled by a timer that wakes up at least one of the more complex battery supplied functions after a power saving period. Depending on events, e.g., sensor signals, counter states or received RF signals, that are detected after the wake-up decisions, about other required operations and the length of the next sleeping period are taken. After finishing the required operations, the tag 300 is set back into the sleeping mode. If a single use battery is used, the sequence may be continued unless the battery is empty. In this case, the battery energy sets a life-time limit for the tag 300. In this case, the size of the battery must guarantee an operation that has a sufficient margin above the required maximum operation time. The maximum operation time could be several months for the monitoring of, for example, a vaccine or a few days for the tracking of a suitcase on a flight.

An output of the energy harvester 330 is connected to an input of the charger 312 and an output of the charger 312 is connected with an input of the integrated battery 320. The function of the energy harvester 330, however, is not necessarily recharging the battery 320 as in classical energy harvesting approaches. As already explained in connection with FIGS. 1A-1B and 2A-2B, the energy harvester or sensor 330 may be used to detect events that are related to the monitoring function of the tag with a minimum of energy consumption from the battery 320. This event detection is used to manipulate the schedule of operations that consume more energy, e.g., more accurate measurements, RF transmissions or complex signal processing.

If the tag 300 is usable over a period that exceeds the battery life time, it should be equipped with a charging mechanism. For the case that the tag 300 is read frequently by a reader that is able to supply it with energy, a recharge of the battery 320 may be achieved during the reading process. This is especially of interest for the case that the battery capacity is low and the charging capability allows high charge transfer rates. In this case, a temperature measurement that allows to control the charging current in a way that the maximum temperature rating of the electro-chemical cell is not exceeded, enables to control the charging current to the tolerable margin and guarantees that the achievable charge transfer is reached during every reader contact.

Another option that allows for longer charging times involves a special charging station. Besides specialized charging devices, mobile phones may be an option especially for tags that built for an every day use. For the case that the tag is attached to the smart phone (directly over a plug or inductively by coupling 2 coils, if the tag fabrication technology is RF capable, a pocket for the tag in a close proximity to the phones antenna would be an option to receive energy as well) for a long time and only removed for a limited time period (e.g. a tag that is used as step counter or heart rate monitor and data logger during sports activities). After the use of the tag, when the tag is attached to the phone, the information that was collected by the tag can be read by the phone again.

For applications that offer a source of energy which can be exploited by the integrated energy harvester in a way that it extracts energy in the same order of magnitude as it is required for at least some of the intended tag functions, the harvested energy can be delivered to the battery charger 312.

Optionally, the state of the battery 320 is monitored at least by measurement of the current that runs into and out of the battery 320 and its output voltage by a suitable meter 314. Combined with the characteristic data of the battery cell, this information delivers an estimation of the state of charge and the battery inner resistance. Since the chemical process is strongly temperature dependent, the accuracy of the battery monitoring may be increased by information from additional sensors like a battery temperature sensor such as that shown and denoted with reference sign 40 in FIG. 1B, which is in close proximity of the battery due to the integration on the same die. As long as the tag circuitry does not produce significant heat or the application requires partial contact to hot or cold objects, the silicon die temperature should be almost constant over the whole chip. In this case, the battery temperature sensor may serve as application temperature sensor as well. The operation of the tag may be changed depending on the state of the battery as follows:

a. If a certain state of charge is undercut, the operation sequence is stretched by an extension of the sleep period,
b. if a certain state of charge is undercut, less important blocks are excluded from the operation sequence,
c. if the battery charge is close to the operation limit, a shut down operation is initiated, e.g. the timer is disabled and the rest of the charge is used to keep the information in the data log memory to keep them available unless the tag is read,
d. in case that the battery temperature indicates that it can not deliver the required current anymore the operation is stretched e.g. by reducing the clock frequency of the battery driven blocks or by running functions sequentially which are usually performed in parallel.

While embodiments of the invention have been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention.

What is claimed is:

1. A semiconductor device, comprising:
   a semiconductor substrate comprising an upper first main face and first and second recess areas formed in the upper first main face;
   a battery arranged at the first recess area; and
   a temperature sensor arranged at the second recess area;
   wherein the second recess area is connected to the outside so that a temperature within the second recess area corresponds to an ambient temperature outside of the semiconductor device, and
   wherein the temperature sensor comprises a thermopile, the thermopile comprising first and second terminals and a meander connecting the first and second terminals with each other, the meander comprising alternating sections of p-doped silicon and n-doped silicon, each one of the alternating sections being arranged in part on the first main face and in part above the second recess area, so that the thermopile delivers a voltage between the first and second terminals, a strength of the voltage being dependent on the ambient temperature.

2. The semiconductor device according to claim 1, wherein the semiconductor device is configured as an identification tag and further comprises a memory to store identification information therein.

3. The semiconductor device according to claim 2, wherein the semiconductor device is configured as a radio frequency identification (RFID) tag and further comprises a radio frequency transceiver.

4. The semiconductor device according to claim 2, wherein the memory is integrated in the semiconductor substrate.

5. The semiconductor device according to claim 2, further comprising:
   a micro-controller integrated in the semiconductor substrate.

6. The semiconductor device according to claim 2, further comprising:
   a battery monitor configured to monitor one or more of:
      an input current, an output current, and an output voltage of the battery.

7. The semiconductor device according to claim 2, wherein the battery monitor is integrated in the semiconductor substrate.

* * * * *